United States Patent
Slettemoen

Patent Number: 5,872,631
Date of Patent: Feb. 16, 1999

[54] OPTICAL TWO- AND THREE-DIMENSIONAL MEASURING OF PROTRUSIONS AND CONVEX SURFACES

[76] Inventor: Gudmunn Slettemoen, Finnmyrveien 2A, N-7060 Klæbu, Norway

[21] Appl. No.: 776,856

[22] PCT Filed: Jul. 20, 1994

[86] PCT No.: PCT/NO94/00129

§ 371 Date: Jan. 21, 1997

§ 102(e) Date: Jan. 21, 1997

[87] PCT Pub. No.: WO96/02806

PCT Pub. Date: Feb. 1, 1996

[51] Int. Cl.⁶ .................................................. G01B 11/24
[52] U.S. Cl. ............................................................ 356/376
[58] Field of Search ............................................. 356/376

[56] References Cited

U.S. PATENT DOCUMENTS

| | | | |
|---|---|---|---|
| 3,782,827 | 1/1974 | Nisenson et al. | 356/376 |
| 4,088,408 | 5/1978 | Burcher et al. | 356/376 |
| 4,452,534 | 6/1984 | Gribanov et al. | 356/376 |
| 4,770,523 | 9/1988 | Yamada | 356/376 |
| 4,872,757 | 10/1989 | Cormack et al. | 356/376 |

*Primary Examiner*—Frank G. Font
*Assistant Examiner*—Zandra V. Smith
*Attorney, Agent, or Firm*—Abelman, Frayne & Schwab

[57] ABSTRACT

A method and an apparatus for dimensional measuring of objects of any form and depth. The apparatus comprises at least an illumination system (1) having an optical filter (4), a manipulator unit (5, 6), and an observation system having an optical filter (9). The optical filters (4, 9) are designed so that most of the light passing the object and not being influenced by the object is stopped. The manipulator unit is such that between measurements either the object is made to rotate about one or more fixed rotation centers or to follow one or more known rotation paths, or the whole or parts of the observation optics are made to carry out a coupled movement or alteration in accordance with the whole or parts of the illumination optics, such that the illumination means and the observation means are completely or partly locked together and are altered relative to the object.

1 Claim, 1 Drawing Sheet

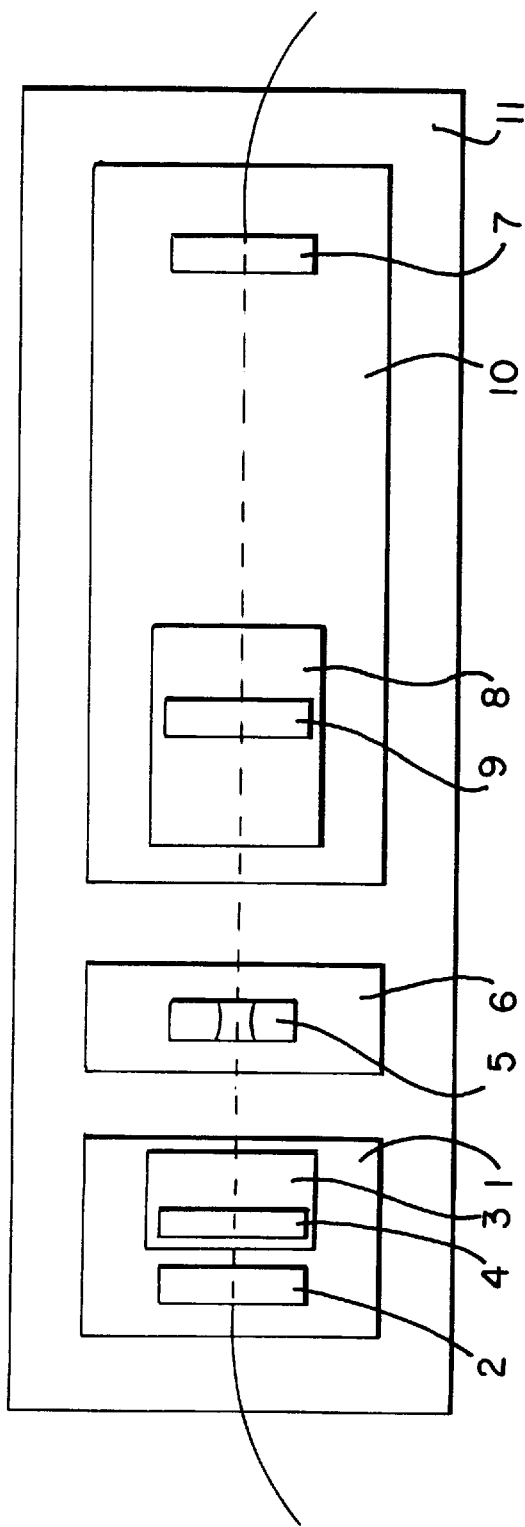

OPTICAL TWO- AND THREE-DIMENSIONAL MEASURING OF PROTRUSIONS AND CONVEX SURFACES

The present invention relates to a method for dimensional measuring, and an apparatus for carrying out the method;

The present invention can be used for generally determining the dimensions of objects of all sizes, but it is especially well suited for determining the dimensions of objects or parts of objects having typical dimensions in the decimeter-micrometer range. It can be of assistance in providing precise and absolute measurement details ranging from percentages to fractions of one tenth per thousand of the dimensions to be determined.

The invention is especially advantageous in cases where the dimensions of convex surfaces or convex parts of surfaces and protrusions, located approximately parallel to the direction of observation, are to be determined. Good examples of such surfaces are the interior walls of wire-drawing dies, nozzles, extruders, ferrules, or the exterior surfaces of wires, fibers, cutting tools, etc.

Objects to be dimensionally determined have in general a three-dimensional demarcation against the surrounding space. Dimensional measuring usually involves characterizing these demarcations by means of diverse distance and angular measures. Optical imaging techniques produce an image of the object. In that process much of the three-dimensional information is lost, and we obtain images which mainly reproduce two-dimensional sections. The parts of the object that lie out of focus will be blurred, and it will be difficult to determine the dimensions of these parts. Seen from an image-processing point of view, the more or less steep steps in the light intensity of the images are generally used as reference positions for the desired dimensional measurements.

In order to find an accurate measuring position, the steps in the images are data processed by means of threshold determination or other, more complicated, algorithms. For example, it is usual to inspect the change in light intensity by means of variations of mathematic derivation followed by center-of-gravity resolution.

These techniques have three important shortcomings:

(1) it is difficult to determine angles of surfaces located approximately parallel to the direction of observation;
(2) it is difficult to determine positions along surfaces located approximately parallel to the direction of observation;
(3) the determination of the position of the generally unsymmetrical steps in light intensity implies uncertainty with respect to geometric positions in the object.

The present invention is an optical imaging technique which, by means of mechanical movements, achieves advantages particularly with respect to the three points mentioned above.

At the present time there is a large selection of optical methods and techniques available for determining dimensions. We shall here briefly describe some of the most important principles and explain some of their advantages and disadvantages.

In general it can be said that optical measuring instruments are frequently very suitable for determining the dimensions of an object.

Lately, the use of relatively sophisticated arrangements has become common. Some of these consist or a more or less conventional microscope objective in combination with a TV camera, video digitalization electronics, and a computer. For somewhat larger objects the microscope objective is replaced by one form or other of a macro or zoom imaging objective. Depending upon the objects, the illumination optics is either arranged with direct lighting and measurement in reflected light or with back lighting and measurement in the shadow image of the object. This gives direct images of objects the dimensions of which are to be determined. More or less steep steps in the light intensity of these images will then be data-processed in order to provide precise positions which can be used as measuring positions for the desired dimensional measurements. These techniques function best when that part of the object of which the dimension is to be determined has a two-dimensional structure which simultaneously can be brought into focus. Thus, they measure mainly in two dimensions perpendicular to the direction of observation.

There are also optical measuring instruments which provide dimensional measurements in all three dimensions. These can be classified according to two main principles, one being triangulation measurements and the other being time delay measurements.

Triangulation measurements may again be classified in subgroups. The triangulation angle is created by illuminating the object from several angles, by observing the object from several angles, or by a combination of these methods.

Time delay measurements are based on measurements corresponding to echo-sounder measurements, or on measurements utilizing a delimited or periodic change in the coherence of light.

Most of the present triangulation techniques are based on reflection from a more or less diffuse surface, and they function unsatisfactorily for mirroring surfaces. The variation which is based on mirror-reflected light is unsatisfactory for surface-parallel incidence.

There is one variant that we would like to mention in particular. It has been used to measure the 3D-form of wire-drawing dies ("Interferometric inspection of small wire-drawing dies," S. J. Bennet, *Opt. Commun,* Vol. 1, No. 5, November/December 1969). Coherent light is directed through the hole. Some of the light passes directly through, and some of it is reflected from the interior walls of the wire-drawing die. The direct and the reflected light interfere, and the periodic interference stripes represent the form of the wire-drawing die. The problem is that the technique may give interference stripes which have changed places, and this cannot be discovered in a periodic interference pattern. Variations based on measurements in the shadow image of the edges of the object is a step in the right direction, but is not by itself sufficient for solving the measuring problem.

Time delay measurements which are based on the echo-sounder principle must resolve time delays in the picosecond range. Today these solutions are too costly. Time delay measurements which are based on a change in coherence and utilization of reflected light are also unsuitable for surface-parallel incidence toward mirroring surfaces. In this geometry their sensitivity is unsatisfactory.

By means of the present invention there is provided a method and an apparatus which circumvent the above problems. The characteristic features of the method are apparent from claim 1, and the characteristic features of the apparatus are apparent from claim 2. Further features of the apparatus are described in the additional dependent claims.

In what follows, the invention will be further described with reference to the FIGURE.

The dotted line shows an extended optical axis in an optical-mechanical apparatus. The illumination system consists of a light source 2 and an imaging system 3 having an optical filter 4.

The light from a light source 2 is filtered by means of the filter 4 and collimated by means of the rest of the imaging system 3.

In this embodiment example we assume, for the sake of simplicity, that the filter 4 is a simple aperture. Alternatively, the filter 4 may be metallic or dielectric grids on surfaces having optically transmitting or reflecting imaging quality. The collimated light strikes/passes an object 5, the dimensions of which are to be determined.

In this example we have suggested that the object 5 is a wire-drawing die having an interior wire-drawing hole (suggested by curved lines), but it can equally well be a wire/thread strung across the optical axis, or a general object of any geometrical form.

Wire-drawing dies are tools for making wires. The holes in the wire-drawing dies have typically a hole diameter ranging from 10 micrometers to a few centimeters. We are interested in determining precisely the diameter measurement, ovalness and depth profile of the wire-drawing hole. Measurement data are collected by a combination of rotating the object 5 by means of a rotational table 6, and imaging the object 5 onto the image-recording detector 7.

The imaging occurs by means of an imaging system 8 which contains an optical filter 9. The combination of imaging system 8, filter 9 and detector 7 we call the observation system 10. The optical filter 9 is placed in or near the image of the filter 4. An F-number on the image side ranges from $20p/\lambda$ to $2p/\lambda$, where p is the magnitude of an element of the detector 7 and $\lambda$ is the mean wavelength of the light. The rotational table 6 rotates the object about two axes which cross each other and the optical axis and is perpendicular to this. For given angles of the rotational table 6, the light will be tangential/parallel to certain positions of the object 5.

The optical filter is formed in such a way that the light which is tangential to these positions in the object 5 and passes the filter 9, provides an unambiguous disclosure of these tangential points in the image by the detector 7. This takes place because the filter carries out an optical preprocessing which in effect both emphasizes the image of the tangential points and unambiguously discloses where these image points lie. This is achieved by designing the optical filters in such a way that most of the light passing the object and not being influenced by the object will be stopped.

A simple example of such geometry is a filter 4 which is formed as a simple aperture, and a filter 9 which is formed as a ring aperture having an blocking disc in the middle.

The imaging detector 7 may be a TV camera transmitting the preprocessed image of the object 5 to digitalization electronics in a personal computer. The magnitude p of the detector element in such a TV camera is the size of the picture element or pixel of the TV picture. Similarly, in an array of detectors (TV-camera, linear arrays, etc.) p is the size of the picture element or pixel. Such an image contains the measurement data of one measurement.

A complete measuring sequence consists in repeatedly altering the angles of the object 5 by means of the rotational table 6. This gives a set of tangential points which by means of computations can be assembled into contour lines of the object 6 in all three dimensions.

In the present example the computations are carried out in a personal computer.

If the object 5 is a wire-drawing die for which we shall find the diameter measurement, ovalness and dept profile, it will be necessary to find two contour lines. The contour line which provides diameter measurement and ovalness will be given by a section between a plane perpendicular to the optical axis and that part of the wall of the hole which defines the smallest aperture of the wire-drawing hole. The contour line which provides the depth profile will be given by a section between a plane transecting the axial symmetry line in the hole and the very wall of the hole.

The present invention thus carries out an effective optical-mechanical preprocessing by combining a stable optical diffraction process and stable mechanical rotational movements with an advantageous optical filtering.

The diffraction process is stable because there havae been selected a shadow geometry and optical filters which provide diffraction images which alter little even though the diffracting objects may be very different. The diffraction image is also more stable than comparable imaging techniques even though the imaging detector 7 registers image points which lie out of focus. The mechanical rotation movement of the rotational table 6 must keep the center of rotation stable so that measurements for different rotation angles can be combined. In this way the sought dimensions of the object can be precisely found in three-dimensional space. Since the image is effectively preprocessed, the measurement algorithms in question will give more accurate dimensional data that those provided by the techniques of the present time.

If the optical filter 9 is formed as a circular-symmetrical bandpass filter which blocks the light which is not influenced by the object 5, the image of the tangential points of the object will form a dark line surrounded by two strongly luminous lines. In contrast to the unsymmetrical transition from a light to a dark field provided by conventional techniques, the dark and light lines disclose better where the image of the tangential points lies. In the algorithms of conventional techniques, assumptions must be made about the light distribution which in certain situations may be wrong. The light distribution according to the present invention will be symmetrical or approximately symmetrical, and will give a greater depth of field, and it will thereby be less influenced by such systematic errors.

The mechanical rotations may also be carried out by a rotational table 11 whereon the illumination system 1 and the observation system 10 are fixedly mounted. Then the unit 6 will instead be a stationary platform for the object 5.

The manipulator unit performing the mechanical rotations contains an electric motor, a pneumatic motor, a piezoelectric translator/rotator or an acoustic-optical deflector which displaces or rotates either the object or at least one light source, mirror, lens, prism, aperture, or detector. The manipulator unit may also contain either a light source to be selected or modulated, or an LCD modulator, and a detector to be modulated, an LCD modulator or a detector assembly to be selected. The light source capable of modulation, or the light source to be selected, are selected from a laser, a light diode, a thermal source, or an electronic blitz. The detector capable of modulation or the detector assembly to be selected either comprises at least one automatically sweeping area or line camera, or at least one position-sensitive detector or a read-off array detector.

I claim:

1. An apparatus for carrying out a method for the dimensional measuring of objects of any form and depth, according to which each measurement in a measuring sequence is determined by composite characteristic spatial features of the light pattern which has passed the object, characterized in that the directions of illumination and the directions of observation are completely or partly locked together and are altered relative to the object, that the directions of illumination and observation are altered relative to the object at least once during a measuring sequence, the position of the object relative to the optics either being known or being fixed in relation to one or more centers of rotation, that an optical filtering is carried out by means of the illumination and observation optics prior to detection by means of an F-number on the image side ranging from $20p/\lambda$ to $2p/\lambda$ wherein p is the magnitude of the detector element and $\lambda$ is the mean wavelength of light, that the optical filtering causes a complete or partial symmetry in the light distribution around the image positions in the object where the light is tangential to the object, and that the positions of the points in the object which are derived from where the light is tangential to the object are computed on the basis of at least two measurements in measuring sequence, said apparatus comprising at least an illumination system having an optical filter, a manipulator unit, and an observation system having an optical filter, characterized in that the optical filters are designed so that the light apertures on the image side are circular-symmetrical and have a maximum diameter which gives a F-number on the image side ranging from $20p/\lambda$ to $2p/\lambda$, and so that most of the light that passes the object and is not influenced by the object is stopped, that the manipulator unit is such that between measurements either the object is made to rotate about one or more fixed rotation centers or to follow one or more known rotation paths, or the whole or parts of the observation optics are made to carry out coupled movement or alteration in accordance with the whole or parts of the illumination optics, so that the directions of illumination and observation are completely or partly locked to each other and are altered relative to the object, and characterized in that the optical filters form completely or partly complementary apertures which are imaged on top of each other or close to each other.

* * * * *